United States Patent
Lee

(10) Patent No.: US 11,831,766 B2
(45) Date of Patent: Nov. 28, 2023

(54) GENERATION OF ENCRYPTION KEYS USING BIOMETRICS

(71) Applicant: David Kye Liang Lee, Wantirna (AU)

(72) Inventor: David Kye Liang Lee, Wantirna (AU)

( * ) Notice: Subject to any disclaimer, the term of this patent is extended or adjusted under 35 U.S.C. 154(b) by 145 days.

(21) Appl. No.: 17/334,129

(22) Filed: May 28, 2021

(65) Prior Publication Data

US 2021/0377013 A1 Dec. 2, 2021

Related U.S. Application Data

(60) Provisional application No. 63/031,309, filed on May 28, 2020.

(51) Int. Cl.
*H04L 9/08* (2006.01)
*H04L 9/32* (2006.01)

(52) U.S. Cl.
CPC .......... *H04L 9/0866* (2013.01); *H04L 9/0869* (2013.01); *H04L 9/0894* (2013.01); *H04L 9/3271* (2013.01); *H04L 9/3247* (2013.01)

(58) Field of Classification Search
CPC ....... H04L 9/08; H04L 9/0866; H04L 9/0869; H04L 9/0894; H04L 9/32; H04L 9/3271; H04L 9/3247; H04L 9/3231; H04L 63/08; H04L 63/0861
See application file for complete search history.

(56) References Cited

U.S. PATENT DOCUMENTS

| | | | | |
|---|---|---|---|---|
| 8,745,405 | B2* | 6/2014 | Pizano | G06F 21/32 |
| | | | | 713/186 |
| 10,313,317 | B2* | 6/2019 | O'Regan | H04L 63/083 |
| 2010/0169651 | A1* | 7/2010 | Scheidt | H04L 9/3231 |
| | | | | 713/176 |
| 2017/0005794 | A1* | 1/2017 | Paddon | H04L 9/0866 |
| 2018/0198609 | A1* | 7/2018 | Khan | H04L 9/3066 |
| 2020/0053076 | A1* | 2/2020 | Hassan | H04L 9/3231 |
| 2020/0401699 | A1* | 12/2020 | Riehl | G06F 21/6245 |

* cited by examiner

*Primary Examiner* — Shaqueal D Wade-Wright
(74) *Attorney, Agent, or Firm* — NORTON ROSE FULBRIGHT US LLP

(57) ABSTRACT

Methods and systems for improved generation of biometrics using biometrics and secure storage of biometrics are provided. In one embodiment, a method is provided that includes scanning and digitizing a plurality of biometrics to form a plurality of digitized biometrics. An encryption key for use in cryptographic applications may be generated based on the plurality of digitized biometrics. A biometrics encryption seed may be received and may be used to encrypt the plurality of digitized biometrics to generate a plurality of encrypted biometrics. The plurality of encrypted biometrics may then be stored.

19 Claims, 4 Drawing Sheets

GENERATION OF ENCRYPTION KEYS USING BIOMETRICS

CROSS REFERENCE TO RELATED APPLICATIONS

The present application claims priority to U.S. Provisional Application No. 63/031,309, filed on May 28, 2020, the disclosure of which is incorporated herein by reference for all purposes.

BACKGROUND

Encryption keys may be used to perform many functions in computing environments. For example, encryption keys may be used to control access to restricted data by encrypting the data such that the data can only be decrypted using encryption keys assigned to authorized users. Also, encryption keys may be used to generate digital signatures or other verifications that a particular, authorized user is using a computing device.

SUMMARY

The present disclosure presents new and innovative methods and systems for improved generation of biometrics using biometrics and secure storage of biometrics. In a first aspect, a method for generating an encryption key for use in cryptographic applications is provided. The method may include (a) scanning a plurality of biometrics, (b) digitizing at least a subset of the plurality of biometrics to form a plurality of digitized biometrics, and (c) generating the encryption key based on the plurality of digitized biometrics. The method may also include (d) receiving a biometrics encryption seed, (e) encrypting the plurality of digitized biometrics at least in part based on the biometrics encryption seed to generate a first plurality of encrypted biometrics, and (f) storing the first plurality of encrypted biometrics.

In a second aspect according to the first aspect, the encryption key is generated based on an ordered sequence of the plurality of digitized biometrics.

In a third aspect according to the second aspect, generating the encryption key based on the plurality of digitized biometrics further comprises generating, based on the ordered sequence of the plurality of digitized biometrics, an intermediate value and generating the encryption key based on the intermediate value.

In a fourth aspect according to any of the first through third aspects, the method further includes receiving, at a later time, the biometrics encryption seed, retrieving the first plurality of encrypted biometrics, and decrypting, based on the biometrics encryption seed, the first plurality of encrypted biometrics to generate the plurality of digitized biometrics and then the encryption key.

In a fifth aspect according to the fourth aspect, the method further includes, prior to retrieving the first plurality of encrypted biometrics presenting a multi-factor authentication challenge and receiving a response that passes the multi-factor authentication challenge.

In a sixth aspect according to any of the fourth and fifth aspects, the method further includes repeating (a)-(c) to receive an updated plurality of biometrics and to generate an updated encryption key based on at least a subset of the updated plurality of biometrics.

In a seventh aspect according to any of the first through sixth aspects, the at least the subset of the plurality of biometrics includes at least two types of biometrics.

In an eighth aspect according to the seventh aspect, the at least two types of biometrics are selected from the group consisting of fingerprint scans, two-dimensional facial scans, three-dimensional facial scans, vocal feedback matching, capillary scans, and iris scans.

In a ninth aspect according to any of the first through eighth aspects, (a)-(c) are performed by a first processor and (d)-(f) are performed by a second processor.

In a tenth aspect according to any of the first through ninth aspects, the method further includes encrypting the plurality of digitized biometrics with a device key to generate a second plurality of encrypted biometrics. The encryption key may be generated based on the second plurality of encrypted biometrics and the second plurality of encrypted biometrics may be encrypted at least in part based on the biometrics encryption seed to generate the first plurality of encrypted biometrics.

In an eleventh aspect according to the tenth aspect, the device key is uniquely and immutably associated with a computing device implementing the method.

In a twelfth aspect according to any of the first through eleventh aspects, the plurality of digitized biometrics are digitized to a volatile memory and are deleted after completion of the method.

In a thirteenth aspect according to any of the first through twelfth aspects, the first plurality of encrypted biometrics are stored in a non-volatile memory.

In a fourteenth aspect according to the thirteenth aspect, the non-volatile memory is at least a part of a secure enclave of a computing device implementing the method.

In a fifteenth aspect according to any of the first through fourteenth aspects, the at least the subset of the plurality of biometrics are encrypted and stored separately.

In a sixteenth aspect according to any of the first through fifteenth aspects, the at least the subset of the plurality of biometrics are encrypted and stored together.

In a seventeenth aspect according to any of the first through sixteenth aspects, the encryption key is generated for use in a particular cryptographic application and is deleted upon completion of the cryptographic application.

In an eighteenth aspect according to any of the first through seventeenth aspects, the cryptographic applications include generating digital signatures, encrypting data, and accessing previously-encrypted data.

In a nineteenth aspect according to any of the first through eighteenth aspects, encrypting the plurality of digitized biometrics includes transforming the plurality of digitized biometrics prior to encrypting the plurality of digitized biometrics with the biometrics encryption seed.

In a twentieth aspect according to any of the first through nineteenth aspects, transforming the plurality of digitized biometrics includes at least one of hashing the plurality of digitized biometrics and salting the plurality of digitized biometrics.

In a twenty-first aspect, a system for generating an encryption key for use in cryptographic applications is provided. The system may include a processor and a memory. The memory may store instructions which, when executed by the processor, cause the processor to (a) scan a plurality of biometrics, (b) digitize at least a subset of the plurality of biometrics to form a plurality of digitized biometrics, and (c) generate the encryption key based on the plurality of digitized biometrics. The memory may store further instructions which, when executed by the processor, cause the processor to (d) receive a biometrics encryption seed, (e) encrypt the plurality of digitized biometrics at least in part based on the biometrics encryption seed to generate a first plurality of encrypted biometrics, and (f) store the first plurality of encrypted biometrics.

In a twenty-second aspect according to the twenty-first aspect, the encryption key is generated based on an ordered sequence of the plurality of digitized biometrics.

In a twenty-third aspect according to the twenty-second aspect, generating the encryption key based on the plurality of digitized biometrics further includes generating, based on the ordered sequence of the plurality of digitized biometrics, an intermediate value and generating the encryption key based on the intermediate value.

In a twenty-fourth aspect according to any of the twenty-first through twenty-third aspects, the memory stores further instructions which, when executed by the processor, cause the processor to receive, at a later time, the biometrics encryption seed, retrieve the first plurality of encrypted biometrics, and decrypt, based on the biometrics encryption seed, the first plurality of encrypted biometrics to generate the plurality of digitized biometrics and then the encryption key.

In a twenty-fifth aspect according to the twenty-fourth aspect, the memory stores further instructions which, when executed by the processor prior to retrieving the first plurality of encrypted biometrics, cause the processor to present a multi-factor authentication challenge and receive a response that passes the multi-factor authentication challenge.

In a twenty-sixth aspect according to any of the twenty-fourth and twenty-fifth aspects, the memory stores further instructions which, when executed by the processor, cause the processor to repeat (a)-(c) to receive an updated plurality of biometrics and to generate an updated encryption key based on at least a subset of the updated plurality of biometrics.

In a twenty-seventh aspect according to any of the twenty-first through twenty-sixth aspects, the at least the subset of the plurality of biometrics includes at least two types of biometrics.

In a twenty-eighth aspect according to the twenty-seventh aspect, the at least two types of biometrics are selected from the group consisting of fingerprint scans, two-dimensional facial scans, three-dimensional facial scans, vocal feedback matching, capillary scans, and iris scans.

In a twenty-ninth aspect according to any of the twenty-first through twenty-eighth aspects, (a)-(c) are performed by a first processor and (d)-(f) are performed by a second processor.

In a thirtieth aspect according to any of the twenty-first through twenty-ninth aspect, the memory stores further instructions which, when executed by the processor, cause the processor to encrypt the plurality of digitized biometrics with a device key to generate a second plurality of encrypted biometrics. The encryption key may be generated based on the second plurality of encrypted biometrics and the second plurality of encrypted biometrics may be encrypted at least in part based on the biometrics encryption seed to generate the first plurality of encrypted biometrics.

In a thirty-first aspect according to the thirtieth aspect, the device key is uniquely and immutably associated with at least a portion of the system.

In a thirty-second aspect according to any of the twenty-first through thirty-first aspects, the plurality of digitized biometrics are digitized to a volatile memory and are deleted after (f).

In a thirty-third aspect according to any of the twenty-first through thirty-second aspects, the first plurality of encrypted biometrics are stored in a non-volatile memory.

In a thirty-fourth aspect according to the thirty-third aspect, the non-volatile memory is at least a part of a secure enclave of the system.

In a thirty-fifth aspect according to any of the twenty-first through thirty-fourth aspects, the at least the subset of the plurality of biometrics are encrypted and stored separately.

In a thirty-sixth aspect according to any of the twenty-first through thirty-fifth aspects, the at least the subset of the plurality of biometrics are encrypted and stored together.

In a thirty-seventh aspect according to any of the twenty-first through thirty-sixth aspects, the encryption key is generated for use in a particular cryptographic application and is deleted upon completion of the cryptographic application.

In a thirty-eighth aspect according to any of the twenty-first through thirty-seventh aspects, the cryptographic applications include generating digital signatures, encrypting data, and accessing previously-encrypted data.

In a thirty-ninth aspect according to any of the twenty-first through thirty-eighth aspects, encrypting the plurality of digitized biometrics includes transforming the plurality of digitized biometrics prior to encrypting the plurality of digitized biometrics with the biometrics encryption seed.

In a fortieth aspect according to any of the twenty-first through thirty-ninth aspects, transforming the plurality of digitized biometrics includes at least one of hashing the plurality of digitized biometrics and salting the plurality of digitized biometrics.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter. For example, reference to numerical terms, such as 'integers', can be understood to represent values, data or other relevant mathematical or computing concepts.

DETAILED DESCRIPTION OF EXAMPLE EMBODIMENTS

Figure 1:
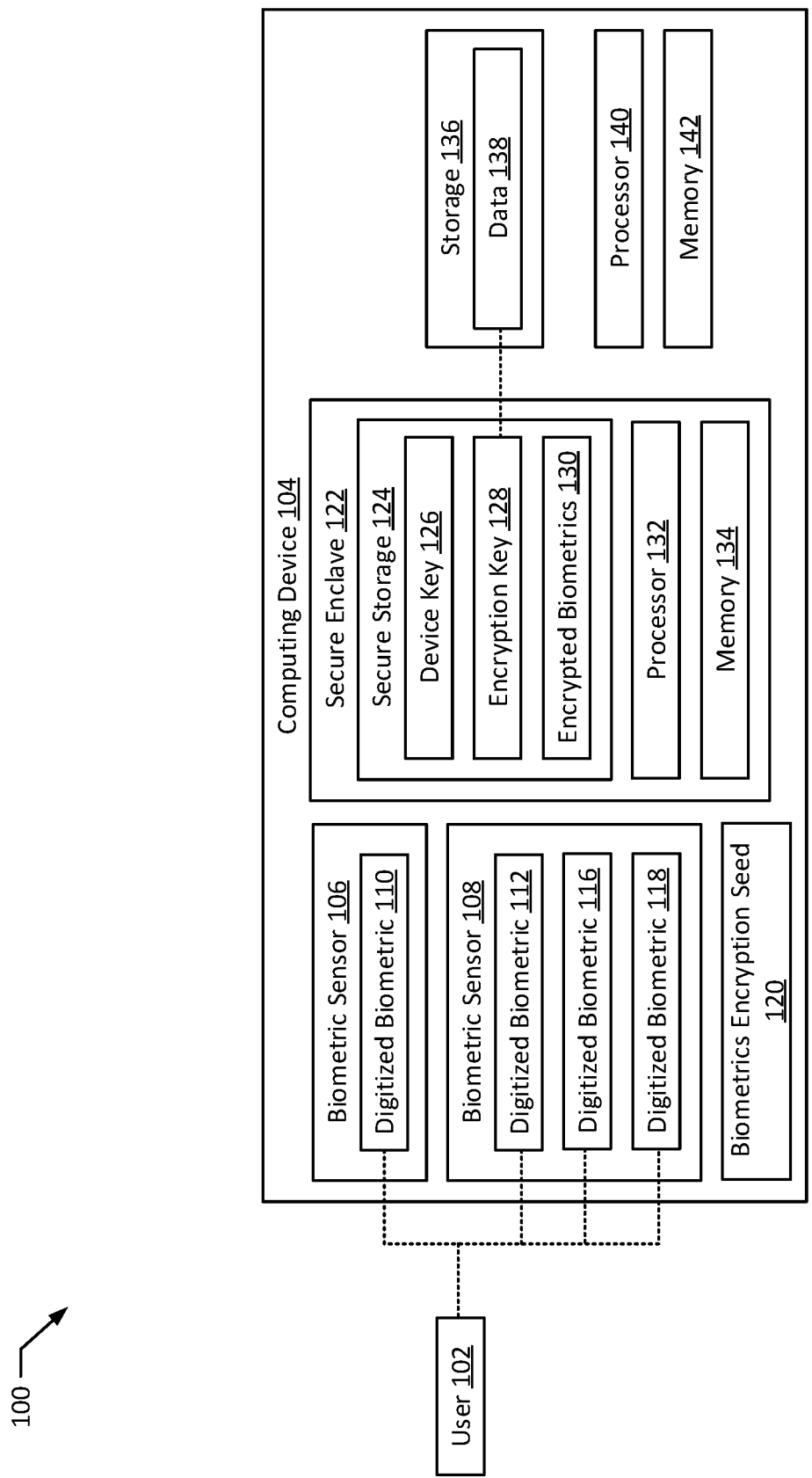
FIG. 1 illustrates a system according to an exemplary embodiment of the present disclosure.

When encryption keys are used to control access to data and/or verify users, storing and tracking the encryption keys may present a logistical difficulty for users. In particular, users may be required to remember, recall, or otherwise store the encryption keys for later use. In certain instances, the encryption keys may be stored using a password, but if the user forgets their password, it may be impossible to access data or verify the users. Additionally, storing encryption keys may present a security risk, as stored keys may be lost, destroyed, or accessed by unauthorized users, allowing the unauthorized users to access the data and or impersonate users (e.g., to gain access to secure systems). For example, encryption keys may be stored digitally or physically. When stored digitally, if the device on which the encryption keys are stored is lost, the encryption keys may be accessed by unauthorized users. When stored physically (e.g., as a written document stored in a safe or other secure area), unauthorized users may infiltrate the secure area and achieve unauthorized access to the encryption keys.

Existing systems may additionally utilize biometric scans or other biometric measures of users' physical, auditory, or other personal characteristics. For example, a biometric may be received from a user and compared to a stored version of a previously-received biometric. If the received biometric matches a previously-received biometric, the system may determine that the user is the same and allow the user access. For example, encryption keys may be stored such that authenticated users (e.g., biometrically-authenticated users) are able to access stored copies of the encryption keys, allowing use of the encryption keys to decrypt encrypted data and/or to verify the users. Using biometric systems to access stored encryption keys may be more convenient than requiring users to enter stored passwords each time they wish to access secured data or systems. However, because the encryption keys are still stored, unauthorized access may still present a security risk.

To address these security risks, the encryption keys themselves may be generated based on received biometrics. For example, a digital copy of a biometric may be received and one or more transformations (e.g., cryptographic transformations) may be applied to the digital copy to create an encryption key. The encryption key may then be used as discussed above, e.g., to secure files or authenticate users. However, different scans of biometrics may differ at different times. For example, different scans of a fingerprint may differ because each scan is of a slightly different portion of the fingerprint, or if the fingerprint has changed (e.g., due to a cut on the finger). As another example, the appearance of a users' face may change over time, resulting in different versions of facial scans being received. In these instances, different digital copies of the biometric may be received which, when transformed according to the one or more transformations, may result in different (i.e., incorrect) encryption keys that cannot be used to verify a user or decrypt previously encrypted data. Therefore, there exists a need to generate encryption keys based on received biometrics that accounts for changes to the biometrics over time.

One solution to this problem is to store encrypted versions of biometrics used to generate encryption keys. For example, one or more biometric scans may be received from a user and may be used to generate an encryption key. The encryption key may be used to secure access to a computing device and/or to secure data stored on the computing device. After use, the encryption key may be deleted such that the encryption key must be regenerated each time the computing device and/or secured data is accessed. In certain instances, the encryption key may be generated based on a particular ordering or multiple biometric scans. A biometrics encryption seed may then be received that is used to encrypt digitized biometrics received during the biometric scans. The encrypted biometrics may then be stored in a non-volatile memory. If, in the future, access is required to the digitized biometrics (e.g., because biometric drift has rendered it difficult or impossible to accurately regenerate the encryption key), the biometrics encryption seed may be received from the user. The encrypted biometrics may then be retrieved and decrypted and used to regenerate the encryption key. In certain instances, the user may be required to specify the correct ordering of the biometrics to accurately generate the encryption key.

FIG. 1 illustrates a system 100 according to an exemplary embodiment of the present disclosure. The system 100 may be configured to generate encryption keys for use in encrypting data stored on a computing device. In particular, the system 100 may be configured to receive and store biometrics and to use the biometrics to generate encryption keys. The system 100 includes a user 102 and a computing device 104. The computing device 104 includes biometric sensors 106, 108, a secure enclave, and a storage 136. The biometric sensors 106, 108 may be configured to scan or otherwise receive one or more biometrics from the user 102. For example, the biometric sensors 106, 108 may include one or more of a fingerprint scanner, a facial scanner (e.g., a two-dimensional facial scanner, a three-dimensional facial scanner), a vocal feedback sensor (e.g., a microphone configured to receive vocal data from the user 102), a capillary scanner, and/or an eye scanner (e.g., an iris scanner). The biometric sensors 106, 108 may be configured to scan one or more corresponding biometrics of the user 102 and to digitize the scans to generate digitized biometrics 110, 112, 116, 118. In one specific example, the biometric sensor 106 may be a three-dimensional facial scanner, and the digitized biometric 110 may be a digitized version of a facial scan performed by the biometric sensor 106. For example, the digitized biometric 110 may represent a three-dimensional depth map of the face of the user 102 scanned by the biometric sensor 106. In another specific example, the biometric sensor 108 may be a fingerprint scanner, and the digitized biometrics 112, 116, 118 may be digitized versions of fingerprint scans performed by the biometric sensor 108. For example, the digitized biometric 112 may represent a digitized version of a scan of the user 102's right index finger, the digitized biometric 116 may represent a digitized version of a scan of the user 102's right thumb, and the digitized biometric 118 represents a digitized version of a scan of the user 102's left thumb.

The storage 136 to be configured to store data 138. For example, the data 138 may include user data stored on the computing device 104. As a specific example, the data 138 may include user data such as documents, emails, photos, videos, software application, and the like. In certain implementations, the data 138 may represent all data stored on the storage 136 and/or all data stored on the computing device 104. An additional or alternative implementations, the data 138 may represent a subset of the data stored on the storage 136 and/or on the computing device 104. For example, the data 138 may represent sensitive data stored on the computing device 104, such as sensitive documents, images, programs, emails, and the like.

The secure enclave 122 may be configured to secure the data 138 stored by the storage 136. In particular, the secure enclave 122 includes a secure storage 124 that stores a device key 126 and an encryption key 128. In certain implementation, the secure storage 124 may include a volatile memory for temporary data storage (e.g., for hours, minutes, seconds, or less) and a non-volatile memory for longer-term data storage (e.g., for days, months, years, or more) and/or may be encrypted using the device key 126. The encryption key 128 may be used to encrypt data 138 stored in the storage 136. In certain instances, the encryption key 128 may be generated according to one or more symmetric or asymmetric key generation techniques. For example, the encryption key 128 may be generated using one or more of the data encryption standard (DES) protocol, the triple DES protocol, the Rivest-Shamir-Adleman (RSA) protocol, the advanced encryption standard (AES) protocol, and the like, and the data 138 may be encrypted using the encryption key 128 according to the corresponding encryption protocol. In particular, the encryption key 128 may be generated based on one or more of the digitized biometrics 110, 112, 116, 118. For example, the encryption key 128 may be generated based on the digitized biometrics 110, 112, 118. The device key 126 may be a unique key immutably associated with the secure enclave 122 and the computing device 104. For example, the device key 126 may be encoded into the hardware implementing the secure enclave 122. The device key 126 may be used to generate the encryption key 128. For example, the device key 126 may be used in combination with one or more of the digitized biometrics 110, 112, 116, 118. For example, the encryption key 128 may be generated based on the device key 126, the digitized biometric 110, and the digitized biometrics 112, 118.

In certain implementations, the secure storage 124 and the secure enclave 122 may additionally be configured to store encrypted biometrics 130. For example, the encrypted biometrics 130 may include encrypted copies of the digitized biometrics 110, 112, 116, 118. In certain implementations, the encrypted biometrics 130 may only include encrypted copies of digitized biometrics used to generate the encryption key 128. In additional or alternative implementations, the encrypted biometrics 130 may include digitized copies of all received digitized biometrics 110, 112, 116, 118, including those not used to generate the encryption key 128. In particular, the encrypted biometrics 130 may be encrypted using a different encryption key than the encryption key 128. For example, the computing device 104 may additionally receive a biometrics encryption seed 120 from the user 102 and may encrypt the encrypted biometrics 130 at least in part based on the biometrics encryption seed 120. For example, the computing device 104 and/or the secure enclave 122 may generate an encryption key based on the biometrics encryption seed 120 and may generate the encrypted biometrics 130 based on the generated encryption key. In certain implementations, each of the digitized biometrics 110, 112, 116, 118 included within the encrypted biometrics 130 may be encrypted separately. Additionally or alternatively, one or more of the digitized biometrics 110, 112, 116, 118 may be encrypted together. For example, the digitized biometrics 112, 116, 118 received from the biometric sensor 108 may be encrypted together within the encrypted biometrics 130. The encrypted biometrics 130 may then be stored within a secure storage 124 for future use. In particular, and as explained further below, the encrypted biometrics 130 may be used in situations where biometric drift causes at least one of the digitized biometrics 110, 112, 116, 118 to differ such that the digitized biometrics may no longer be used to generate the same encryption key 128. The biometrics encryption seed 120 used to generate the encrypted biometrics 130 may include one or more of a passphrase (e.g., a textual, alphanumeric passphrase), a passcode (e.g., a numeric passcode), a two-factor authentication challenge, one or more additional biometric scans (e.g., a digitized biometric 116 not used to generate the encryption key 128), and the like.

In certain implementations, the secure enclave 122 may be at least partially optional. For example, in certain implementations, the computing device 104 may be configured to generate the encryption key 128 without using the secure enclave 122 and/or the secure storage 124. For example, the computing device 104 may receive the device key 126 and/or the digitized biometrics 110, 112, 116, 118, and may generate the encryption key 128. Additionally or alternatively, the secure enclave 122 may receive the digitized biometrics 110, 112, 116, 118 and may generate a value (e.g., an intermediate encryption key) using the device key 126 and the digitized biometrics 110, 112, 116, 118. In such implementations, the secure enclave 122 may provide the value to the computing device 104, which may then generate the encryption key 128 based on the received value. Additionally or alternatively, the computing device 104 may store the encrypted biometrics 130 outside of the secure storage 124. For example, the computing device 104 may encrypt the biometrics 130 using the biometrics encryption seed 120 and may store the encrypted biometrics 130 within the storage 136 (e.g., such as a separate partition of the storage 136 from the data 138). In still further implementations, the secure enclave 122 may encrypt the biometrics to generate the encrypted biometrics 130 and may provide the encrypted biometrics 130 to the computing device 104 to store within the storage 136. Accordingly, it should be understood that references in the present disclosure to operations performed by the secure enclave 122 and/or the secure storage 124 may be similarly implemented by the computing device 104 and the storage 136.

In still further implementations, the secure enclave 122 may be implemented at least partially as a device external to the computing device 104. For example, the secure enclave 122 may be implemented as a hardware device that is communicatively coupled to the computing device 104. In such instances, the device key 126 may be uniquely and immutably associated with the hardware device containing the secure enclave 122. In such implementations, the hardware device may further include one or more of the biometric sensors 106, 108.

The computing device 104 may be implemented as one or more personal computing devices. For example, the computing device 104 may be implemented as a personal computer, laptop computer, a tablet computer, a smartphone, a smartwatch, and the like. In certain implementations, the user 102 may be an owner or other authorized user of the computing device 104. In particular, the techniques discussed above in connection with the system 100 may be initially performed by the user 102 to create the encryption key 128, thereby securing the data 138 and the computing device 104.

The processor 140 and the memory 142 may implement one or more aspects of the computing device 104. For example, the memory 142 may store instructions which, when executed by the processor 140, cause the processor 140 to implement one or more operational features of the computing device 104. The processor 132 and the memory 134 may similarly implement one or more aspects of the secure enclave 122. For example, the memory 134 may store instructions which, when executed by the processor 132, cause the processor 132 to implement one or more operational features of the secure enclave 122. Furthermore, it should be noted that, in preferred implementations, the processor 132 of the secure enclave 122 may be separate from the processor 140 implementing the computing device 104. For example, the processor 132 and the processor 140 may be implemented by separate computing chips or processing cores within the computing device 104. Also, the secure storage 124 and the storage 136 may be implemented as one or more storage devices. For example, the secure storage 124 in the storage 136 may be implemented as one or more hard disk drives, solid-state drives, read-only memories, and the like. In particular, the secure storage 124 may be implemented at least in part using a read-only memory storing the device key 126.

Figure 2A:
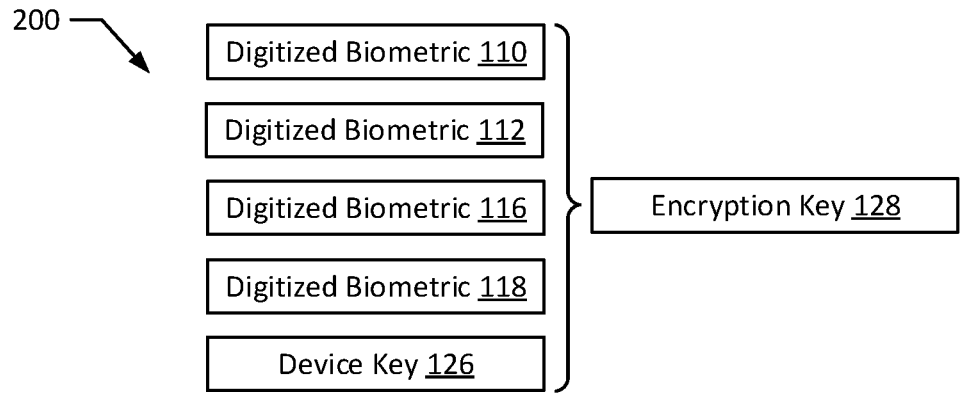
FIGS. 2A-2C illustrate encryption procedures according to exemplary embodiments of the present disclosure.
Figure 2B:
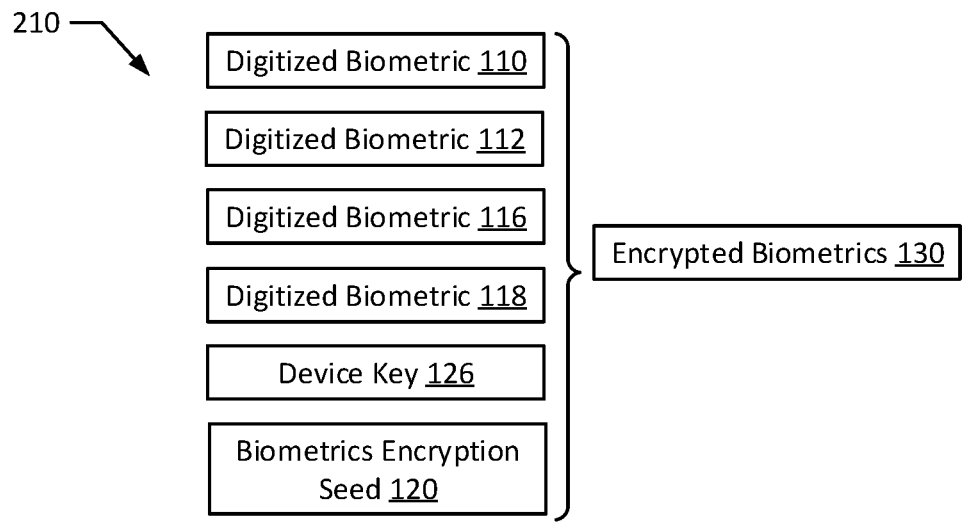
Figure 2C:
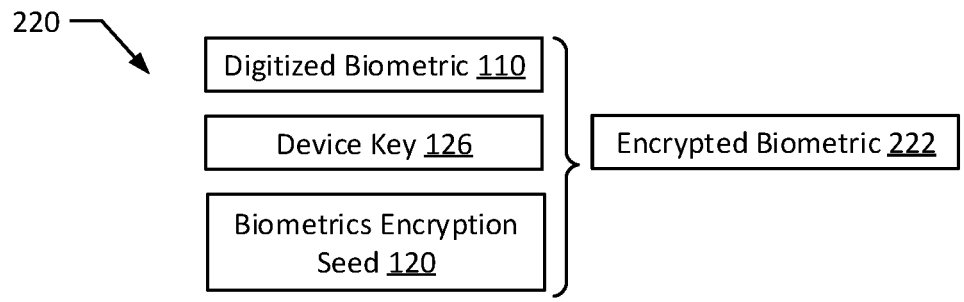

FIGS. 2A-2C illustrate encryption procedures 200, 210, 220 according to exemplary embodiments of the present disclosure. The encryption procedures 200, 210, 220 may be performed to generate encryption keys and/or encrypted biometrics. For example, the encryption procedures 200, 210, 220 and/or similar procedures may be performed by the computing device 104 and/or the secure enclave 122 to generate encryption keys 128 and encrypted biometrics 130.

Turning to FIG. 2A, the encryption procedure 200 is performed to generate an encryption key 128. In the encryption procedure 200, the secure enclave 122 may generate an encryption key 128 using all of the received digitized biometrics 110, 112, 116, 118 and the device key 126. In particular, to generate the encryption key 128, the secure enclave 122 may combine the digitized biometrics 110, 112, 116, 118 and the device key 126 using one or more encryption protocols, such as the triple DES, RSA, and/or AES protocols. In particular, the secure enclave 122 may combine the digitized biometrics 110, 112, 116, 118 and the device key 126 at the same time. Additionally or alternatively, the secure enclave 122 may combine the digitized biometrics 110, 112, 116, 118 into an intermediate value, and may then combine the device key 126 and the intermediate value to generate the encryption key 128. In certain instances, the digitized biometrics 110, 112, 116, 118 may be transformed prior to generating the encryption key 128. For example, the digitized biometrics 110, 112, 116, 118 may be hashed or salted (e.g., separately or in combination) prior to generating the encryption key 128.

In certain instances, the digitized biometrics 110, 112, 116, 118 may be converted to unique numbers (e.g., unique integers) based on one or more features identified within digitized biometrics 110, 112, 116, 118. For example, the secure enclave 122 may perform a features analysis on the digitized biometrics 110, 112, 116, 118 to identify one or more predetermined features. As a specific example, for digitized biometrics 110, 112, 116, 118 based on fingerprint scans, the secure enclave 122 may identify features such as bifurcations, terminations, lakes, independent ridges, dots, spurs, and/or crossovers within the digitized biometrics 110, 112, 116, 118. The secure enclave 122 may then create a feature map by linking the predetermined features (e.g., into a mesh such as a triangular mesh). A subregion of the feature map may be selected based on predetermined rules, such as the number (e.g., 3 features, 5 features, 10 features) and relationship (e.g. position, distance, angle) between features. A unique number (e.g., a unique integer) may then be generated based on the digitized biometric 110, 112, 116, 118 based on the predetermined rules. Unique numbers associated with the digitized biometrics 110, 112, 116, 118 may then be combined to generate the encryption key 128 using the techniques discussed above.

In certain implementations, the encryption protocol used to generate the encryption key 128 may depend on the order in which the digitized biometrics 110, 112, 116, 118 are received and/or the timing with which the digitized biometrics 110, 112, 116, 118 are received. For example, the digitized biometrics 110 may be received first, followed by the digitized biometrics 112, the digitized biometric 116, and then the digitized biometric 118. For illustration purposes, the ensuing examples assume that the digitized biometrics are received as three-digit integers. In particular, the digitized biometric 110 may be received as "111", the digitized biometric 112 may be received as "222", the digitized biometric 116 may be received as "333", and the digitized biometric 118 may be received as "444". In such implementations, the digitized biometrics 110, 112, 116, 118 may be combined in the order in which they are received. For example, the digitized biometrics 110 (i.e., "111") may first be combined with the digitized biometric 112 ("222") to form a first intermediate value (i.e., "111222"). The first intermediate value (i.e., "111222") may then be combined with the digitized biometric 116 (i.e., "333") to form a second intermediate value (i.e., "111222333"). The second intermediate value (i.e., "111222333") may then be combined with the digitized biometric 118 (i.e., "444") to form a third intermediate value (i.e., "111222333444"). The third intermediate value may be combined with the device key 126 to form the encryption key 128. In additional or alternative implementations, the device key 126 may initially be combined with the digitized biometric 110 before subsequent combinations with the digitized biometrics 112, 116, 118. Additionally or alternatively, the device key 126 may be combined with at least a subset of the digitized biometrics 110, 112, 116, 118 prior to combining the digitized biometrics 110, 112, 116, 118 overall. Further techniques, orders, and/or sequences for generating the encryption key 128 may be apparent to one skilled in the art in light of the present disclosure. In particular, certain implementations may repeat one or more of the digitized biometrics 110, 112, 116, 118 to generate the encryption key 128 (e.g., by scanning the same biometric multiple times, using a "repeat" function to store and reuse the same biometric multiple times). Furthermore, rather than appending unique numbers associated with the digitized biometrics 110, 112, 116, 118, the intermediate values may be generated by hashing the digitized biometrics together. All such techniques, orders, and/or sequences are hereby contemplated and considered within the scope of the present disclosure. As another example, the digitized biometrics 110, 112, 116, 118 may be combined according to the timing with which they were received. For example, if the digitized biometric 110 (i.e., "111") was received 250 ms before the digitized biometrics 112 (i.e., "222"), the timing difference may be rounded up to the nearest 100 ms (i.e., "300") and the timing difference may be combined with the digitized biometrics 110, 112 to generate the first intermediate value (i.e., "300111222", "111300222", "111222300"). Furthermore, the numbers and intermediate values can be transformed, e.g. by hashing, prior to generation of the encryption key 128, to obfuscate the number and types of inputs used to generate the encryption key 128. Other techniques may be used to generate encryption keys based on the timing difference, and all such techniques are hereby contemplated.

Requiring multiple digitized biometrics 110, 112, 116, 118 to generate the encryption key 128 may improve security, as additional biometrics may be difficult to falsify or procure. Also, utilizing multiple digitized biometrics may allow for more flexible responses to detecting drift in a user's biometrics. For example, the additional security provided by using multiple biometrics may allow for more error to be tolerated in the underlying digitized biometrics (i.e., more "biometric drift") without compromising the overall security of the generated encryption keys 128. Furthermore, implementations where the encryption key 128 is generated based on the order and/or timing in which the biometrics are received may still further improve security by requiring a proper ordering of the biometrics, which may be even more difficult to procure or falsify.

Turning to FIG. 2B, the encryption procedure 210 may be performed to generate encrypted biometrics 130 for later use. For example, the encryption procedure 210 may be performed to encrypt and store the digitized biometrics 110, 112, 116, 118 in the secure storage 124. In particular, the encryption procedure 210 may be performed to encrypt the digitized biometrics 110, 112, 116, 118 in combination into a single encrypted biometrics 130 for storage. In particular, the digitized biometrics 110, 112, 116, 118 may be encrypted using an encryption key generated based on the device key 126 and/or the biometrics encryption seed 120. For example, the secure enclave 122 may generate an encryption key according to one or more of the above-discussed encryption protocols utilizing the device key 126 and the biometrics encryption seed 120. The encryption key may then be used to encrypt the digitized biometrics 110, 112, 116, 118 as a whole to generate the encrypted biometrics 130.

In alternative implementations, the digitized biometrics 110, 112, 116, 118 may be encrypted separately. For example, and turning to FIG. 2C, the encryption procedure 220 may be performed to encrypt individual biometrics to generate an encrypted biometric 222. For example, the encryption procedure 220 may be generated to encrypt the digitized biometric 110 into the encrypted biometrics to 22. In particular, the digitized biometric 110 may be encrypted with the device key 126 and/or the biometrics encryption seed 120. For example, the device key 126 and the biometrics encryption seed 120 may be used to generate an encryption key according to one or more of the above-discussed encryption protocols. The encryption key may then be used to encrypt the digitized biometrics 110, generating the encrypted biometric 222.

Procedures similar to the encryption procedure 220 may be performed to generate individual encrypted biometrics for each of the digitized biometrics 112, 116, 118. For example, an encrypted biometric may be created for each of the digitized biometrics 112, 116, 118 using the same encryption key (e.g., using the encryption key generated from the same device key 126 and/or the same biometrics encryption seed 120). Additionally or alternatively, different encryption keys may be used to generate encrypted biometrics for each of the digitized biometrics 112, 116, 118. For example, the computing device 104 may receive multiple biometric encryption seeds and may use each biometric encryption seed to generate a different encrypted biometric for each of the digitized biometrics 112, 116, 118. In still further implementations, one biometrics encryption seed 120 may be used for digitized biometrics 110 from a first biometric sensor and a different biometrics encryption seed may be used for digitized biometrics 112, 116, 118 received from another biometric sensor 108. Furthermore, only a subset of the digitized biometrics 110, 112, 116, 118 may be individually encrypted in certain implementations. For example, in one implementation, only the digitized biometric 110 may be individually encrypted to generate the encrypted biometric 222. In such examples, other digitized biometrics may be collectively encrypted. For example, the digitized biometrics 112, 116, 118 may be collectively encrypted using techniques similar to those discussed above in connection with the encryption procedure 210. In light of the above disclosure, additional techniques and/or combinations for individually and collectively generating encrypted biometrics 130, 222 may be apparent to one skilled in the art. All such techniques and combinations are hereby contemplated within the scope of the present disclosure.

In certain implementations, the encryption procedures 210, 220 may be performed in combination with the encryption procedures 200. For example, in certain implementations, the encryption key 128 may be generated by encrypting the digitized biometrics 110, 112, 116, 118 with the device key 126 to generate first encrypted biometrics. In such instances, the first encrypted biometrics may be used as the encryption key 128 or the encryption key 128 may be generated based on the first encrypted biometrics. Also, in such instances, the encrypted biometrics 130, 222 may be generated based on the first encrypted biometrics. For example, where the first encrypted biometrics are generated by encrypting the digitized biometrics 110, 112, 116, 118 together, the encrypted biometrics 130 may be generated by further encrypting the first encrypted biometrics with the biometrics encryption seed 120. As another example, where the first encrypted biometrics are generated by encrypting the digitized biometrics 110, 112, 116, 118 separately, individual encrypted biometrics 222 may be generated by further encrypting individual encrypted biometrics from the first encrypted biometrics using the biometrics encryption seed 120.

As described above, each of the encryption procedures 200, 210, 220 may utilize the device key 126. Such implementations may further improve the security of the stored encrypted biometrics 130, 222 and the data 138 secured by the encryption key 128. In particular, as described above, the device key 126 may be immutably stored and uniquely associated with the computing device 104. Accordingly, where the device key 126 is used to generate the encryption key for the encrypted biometrics 130, 222, it may be impossible to decrypt the encrypted biometrics 130, 222 unless the encryption key is generated by the computing device 104. Accordingly, even if copies of the encrypted biometrics 130, 222 or access and the biometrics encryption seed 120 is known, malicious actors may be unable to decrypt and accept the digitized biometrics 110, 112, 116, 118 without access to the computing device 104.

However, it should also be understood that the encryption procedures 200, 210, 220 are exemplary implementations for generating an encryption key 128, encrypted biometrics 130, and an encrypted biometric 222. In particular, additional or alternative implementations may omit one or more of the depicted components of the encryption procedures. For example, in certain implementations of the encryption procedures 200, 210, 220, the device key 126 may be omitted. In particular, the device key may be omitted when generating at least one of the encryption key 128 and the encrypted biometrics 130, 222. For example, the device key 126 may be omitted to enable the generation of the encryption key 128 and/or the encrypted biometrics 130, 222 if a user loses the computing device 104 and is therefore unable to access the device key 126.

Figure 3:
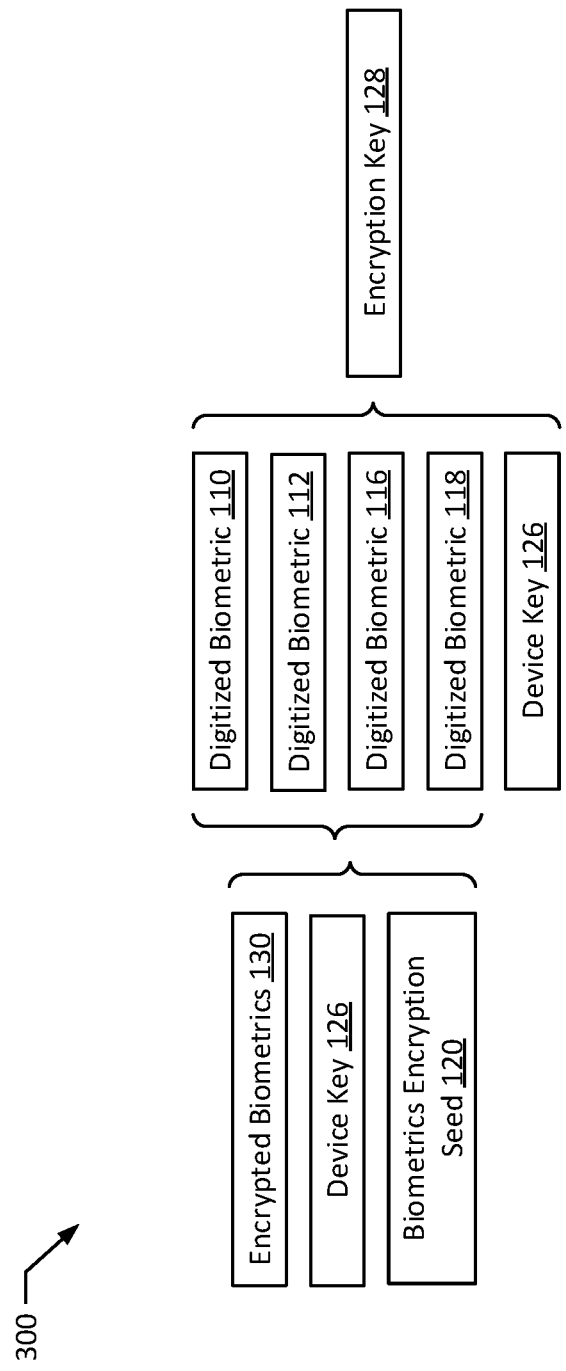
FIG. 3 illustrates a decryption procedure according to an exemplary embodiment of the present disclosure.

FIG. 3 illustrates a decryption procedure 300 according to an exemplary embodiment of the present disclosure. The decryption procedure 300 may be performed to retrieve digitized biometrics 110, 112, 116, 118 stored as encrypted biometrics 130 within the computing device 104. In particular, the digitized biometrics 110, 112, 116, 118 may be retrieved to generate the encryption key 128 in order to, e.g., authenticate the user 102 and/or access the data 138. In certain instances, the decryption procedure 300 may be performed in response to receiving a request from a user. Additionally or alternatively, the decryption procedure 300 may be performed in response to detecting a change in one or more of the user's biometrics. For example, if a confidence measure for a match of a biometric provided by the users falls below a predetermined threshold, the decryption procedure 300 may be performed to retrieve the previously-stored digitized biometrics 110, 112, 116, 118. After performing the decryption procedure 300, new digitized biometrics may be received, and a new encryption key may be generated to replace the encryption key 128.

To begin, the secure enclave 122 and/or the computing device 104 may receive a biometrics encryption seed 120 from the user 102. Upon receiving the biometrics encryption seed 120, the secure enclave 122 may retrieve the encrypted biometrics 130 and the device key 126 (e.g., from the secure storage 124). In certain implementations, prior to retrieving the encrypted biometrics 130, the secure enclave 122 and/or the computing device 104 may present a multi-factor authentication (MFA) challenge to the user. For example, the MFA challenge may include presenting a request for an MFA code (e.g., a numeric or alphanumeric code); sending an MFA code to the user via text message, software application, and the like; and/or requesting a single-use or multi-use MFA code. A response to the MFA challenge may then be received from the user 102 and the encrypted biometrics 130 may then be retrieved only if the response received from the user 102 passes the challenge (e.g., matches an expected response to the MFA challenge). In addition or alternative to the MFA challenge, device verification may be performed on the computing device 104 (e.g., to confirm that one or more of the device name, device serial number, device media access control (MAC) address matches the device used to create the encryption key 128). The secure enclave 122 may then attempt to decrypt the encrypted biometrics 130 using the device key 126 and the biometrics encryption seed 120. For example, the secure enclave 122 may create an encryption key using the device key 126 and a biometrics encryption seed 120 using techniques similar to those discussed above in connection with the encryption procedures 210, 220. The secure enclave 122 may then attempt to decrypt the encrypted biometrics 130 using the generated encryption key. If the digitized biometrics 110, 112, 116, 118 are successfully decrypted from the encrypted biometrics 130, the secure enclave 122 and/or the computing device 104 may determine that the biometrics encryption seed 120 was correctly received from the user 102 and that the user 102 may proceed with utilizing the digitized biometrics 110, 112, 116, 118 that were extracted. If, however, the encrypted biometrics 130 are not successfully decrypted, the computing device 104 and/or the secure enclave 122 may determine that the user 102 did not provide the correct biometrics encryption seed 120 and may terminate processing of the encrypted biometrics 130, or may query the user 102 to re-enter the correct biometrics encryption seed 120.

The secure enclave 122 may then proceed with generating the encryption key 128 based on the digitized biometrics 110, 112, 116, 118 decrypted from the encrypted biometrics 130 and the device key 126. In particular, the secure enclave 122 may generate the encryption key 128 using techniques similar to those discussed above (e.g., in connection with the encryption procedure 200). In certain instances, where generating the encryption key 128 depends on the order in which the digitized biometrics 110, 112, 116, 118 are received, the computing device 104 may prompt the user 102 to enter a sequence in which the digitized biometrics 110, 112, 116, 118 should be used to generate the encryption key 128. For example, the computing device 104 may display a graphical interface that includes visual identifiers of the digitized biometrics 110, 112, 116, 118 in a randomized array or list that can be used to select an ordering of the digitized biometrics 110, 112, 116, 118 to use in generating the encryption key 128. Using the graphical interface, the user 102 may indicate that the digitized biometric 110 should be used first, followed by the digitized biometric 112, which is followed by the digitized biometric 116, and finally the digitized biometric 118. Additionally, if input timing was used to generate the encryption key, the timing can also be replicated via the graphical interface. In certain implementations, to assist the user 102 in entering the proper sequence for the digitized biometrics 110, 112, 116, 118, the digitized biometrics 110, 112, 116, 118 may be stored in connection with identifiers (e.g., visual or textual identifiers) of the type of biometric scan. For example, the digitized biometric 110 may be stored in connection with an indication of a facial scan, the digitized biometric 112 may be stored with an indication of a right index finger scan, the digitized biometric 116 may be stored in connection with an indication of a right thumb scan, and the digitized biometric 118 may be stored in connection with an indication of a left thumb scan. When presenting the digitized biometrics 110, 112, 116, 118 to the user 102 for selection, the computing device 104 may additionally display a depiction of the indication stored in connection with the digitized biometrics 110, 112, 116, 118. As also explained above, generating the encryption key 128 using techniques that rely on the correct ordering and/or timing between inputs of the digitized biometrics 110, 112, 116, 118 may provide an additional layer of security. In particular, even if a malicious actor knows the biometrics encryption seed 120 used by the user 102 to store the encrypted biometrics 130, the malicious actor would also have to know the correct order and/or timing between inputs of the digitized biometrics 110, 112, 116, 118 to properly generate the encryption key 128. Furthermore, to increase security, only a limited number of attempts may be allowed to enter the correct order of the digitized biometrics 110, 112, 116, 118. Additionally or alternatively, the digitized biometrics 110, 112, 116, 118 may be transformed (e.g., hashed or salted) before being encrypted to protect the contents of the digitized biometrics 110, 112, 116, 118 even when subsequently decrypted, and/or to obfuscate the number of digitized biometrics used to generate the encryption key 128.

Figure 4:
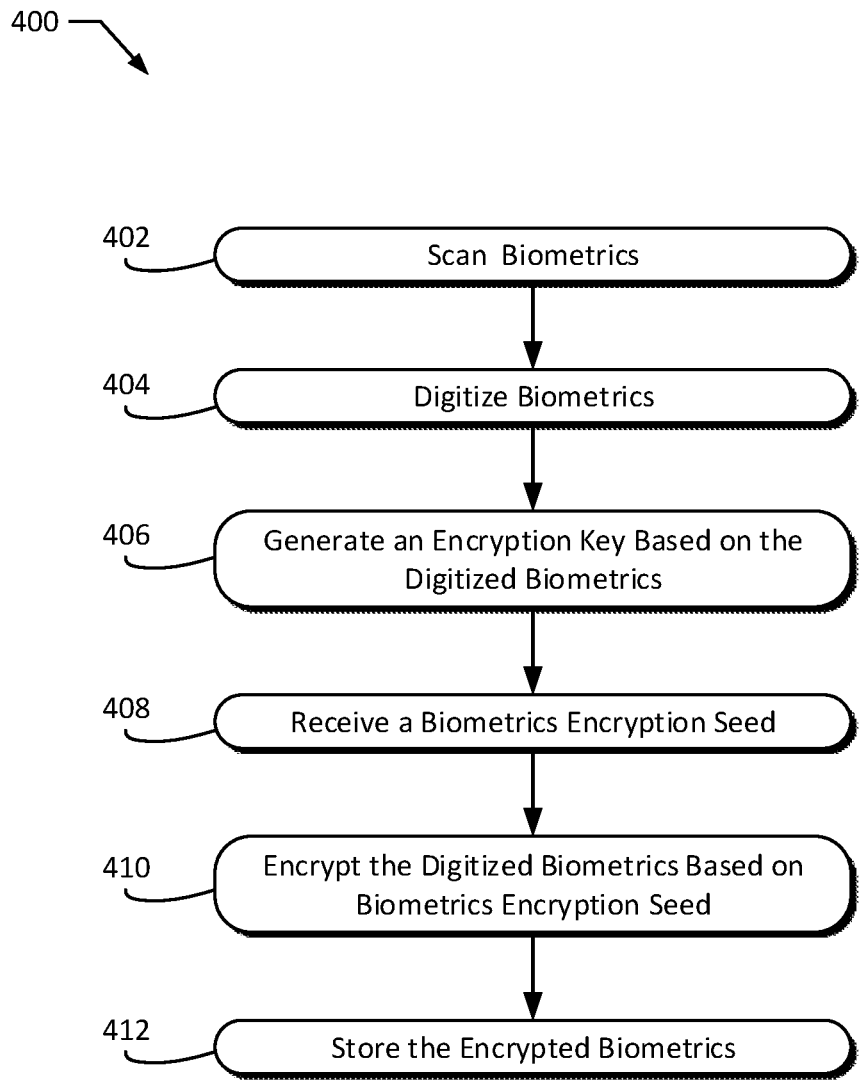
FIG. 4 illustrates a method for generating encryption keys and storing encrypted biometrics according to an exemplary embodiment of the present disclosure.

FIG. 4 illustrates a method 400 for generating encryption keys and storing encrypted biometrics according to an exemplary embodiment of the present disclosure. The method 400 may be implemented on a computer system, such as the system 100. For example, the method 400 may be implemented by the computing device 104 and/or the secure enclave 122. The method 400 may also be implemented by a set of instructions stored on a computer that, when executed by a processor, cause the computer system to perform the method 400. For example, all or part of the method may be implemented by the processors 132, 140 and the memories 134, 142. Although the examples are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with scanning biometrics (block 402). For example, the biometric sensors 106, 108 may scan one or more biometrics of a user 102. For example, the biometric sensors 106, 108 may be externally located on computing device 104 and the user 102 may utilize the biometric sensors 106, 108 to scan the one or more biometrics. In certain implementations, and as explained further above, the biometrics may include different types of biometric scans (e.g., facial scans, fingerprint scans, vocal imprints scans, capillary scans, iris scans, and the like). Furthermore, in certain instances, the biometrics may include multiple scans of the same type of biometrics (e.g., multiple fingerprint scans of the same or different finger). Additionally, the computing device 104 may prompt the user 102 to perform a particular number and/or a particular type of biometric scan. For example, the computing device 104 may require at least four total biometric scans and at least two different types of biometric scan (e.g., one facial scan and three fingerprint scans). In certain implementations, the biometrics may be scanned from multiple users or individuals. For example, the biometrics may include a facial scan of a first user, a facial scan of the second user, and fingerprint scans of the first and second users.

The biometrics may be digitized (block 404). For example, upon receiving the biometric scans, the biometric sensors 106, 108 may digitize the scans to generate one or more digitized biometrics 110, 112, 116, 118. In particular, in certain implementations, the digitized biometrics 110, 112, 116, 118 may be performed at least partially in parallel with receiving the biometric scans in block 402. For example, the digitized biometrics 110, 112, 116, 118 may be generated as the biometric scans are performed. In certain implementations, the digitized biometrics 110, 112, 116, 118 may further be generated to secure the contents of the biometric scans themselves. For example, the digitized biometrics 110, 112, 116, 118 may be generated by hashing or otherwise obfuscating the contents of the biometric scans using a unique identifier associated with the computing device 104 (e.g., the device key 126), a unique identifier associated with the biometrics sensor 106, 108 generating the digitized biometric 110, 112, 116, 118, and/or another type of unique identifier. In certain implementations, the digitized biometrics 110, 112, 116, 118 may be generated by the biometric sensors 106, 108 and/or by the secure enclave 122.

An encryption key may be generated based on the digitized biometrics (block 406). For example, the secure enclave 122 may generate an encryption key 128 based on the digitized biometrics 110, 112, 116, 118. As explained above, the encryption key 128 may be generated according to one or more symmetric or asymmetric encryption protocols, such as the triple DES, AES, and RSA protocols. In particular, in certain implementations, the encryption key 128 may be generated based on the order in which the digitized biometrics 110, 112, 116, 118 are received (e.g., the order in which the biometrics are scanned in block 402). In certain implementations, the encryption key 128 may not be generated based on all of the digitized biometrics 110, 112, 116, 118. For example, the encryption key 128 may be generated based on the digitized biometric 110 along with the digitized biometrics 112, 118. After generating the encryption key 128, the secure enclave 122 and/or the computing device 104 may encrypt the data 138 on the storage 136 using the encryption key 128. In particular, the data 138 and be encrypted by the encryption key 128 to require authentication of the user 102 prior to gaining access to the data 138. In certain implementations, after encrypting the data 138, the encryption key 128 may be deleted from the secure storage 124. In particular, the encryption key 128 may be stored on a volatile memory of the secure enclave 122 and may be deleted upon successfully encrypting the data 138. Additionally or alternatively, the encryption key 128 may be stored while the user 102 interacts computing device 104 and may be deleted when the user 102 finishes interacting with the computing device 104 (e.g., locks, logs off of, or powers down the computing device 104). Furthermore, in certain implementations, more than one encryption key 128 may be generated based on the digitized biometrics 110, 112, 116, 118. For example, a first encryption key 128 may be generated to encrypt the data 138 and/or secure access to the computing device and a second encryption key may be generated for use in digital signatures by the user 102.

A biometrics encryption seed may be received (block 408). For example, the computing device 104 may receive the biometrics encryption seed 120 from the user 102. The biometrics encryption seed 120 may include a passphrase, such as an alphanumeric passphrase, a numeric passcode, and/or a digitized biometric. For example, the biometrics encryption seed 120 may be a digitized biometric received subsequent to the biometrics scanned at block 402. In particular, after generating the encryption key 128, the computing device 104 may prompt the user to enter the biometrics encryption seed 120 and may present the option to scan an additional biometric for use as the biometrics encryption seed 120. As another example, the biometrics encryption seed 120 may be a digitized biometric that was received previously but is not used in generating the encryption key 128. As a specific example, where the encryption key 128 is generated using the digitized biometrics 110, 112, 118, the biometrics encryption seed may include the digitized biometric 116. In certain implementations, the biometrics encryption seed 120 may include more than one of the above examples. For example, the biometrics encryption seed may include an alphanumeric passphrase in combination with a digitized biometric. In certain implementations, the biometrics encryption seed may be received from a user or individual different from the user or individuals from which biometrics were scanned in block 402. For example, the biometrics encryption seed 120 may be received from a third user. As a specific example, the encryption key 128 may be generated to secure sensitive data during negotiations between two parties and may be generated using biometric scans from both parties (e.g., both users). In such a situation, the biometrics encryption seed 120 may be received from a neutral third party (e.g., a lawyer, arbitrator, judge) to prevent unilateral decryption of the sensitive data by either party individually without permission from the neutral third party. Additionally or alternatively, the biometrics encryption seed 120 may accordingly be used to enable decryption of the sensitive data if one of the parties dies or is no longer able to provide an adequate biometric scans (e.g., loses a finger). As can be seen in the above examples, the combination of digitized biometrics and the biometrics encryption seed 120 may be received from multiple users as needed to ensure that data is protected from unilateral use.

The digitized biometrics may be encrypted based on the biometrics encryption seed (block 410). For example, the secure enclave 122 and/or the computing device 104 may encrypt the digitized biometrics 110, 112, 116, 118 based on the biometrics encryption seed 120. In particular, and as discussed below in connection with the encryption procedures 210, 220, the biometrics encryption seed 120 may be used with the device key 126 to generate an encryption key that is then used to encrypt the digitized biometrics 110, 112, 116, 118. The digitized biometrics 110, 112, 116, 118 may be encrypted together into a single stored set of combined encrypted biometrics 130 (e.g., as in the encryption procedure 210). Additionally or alternatively, one or more of the digitized biometrics 110, 112, 116, 118 may be encrypted separately into individual encrypted biometrics 222 (e.g., as in the encryption procedure 220). In certain implementations, the digitized biometrics 110, 112, 116, 118 may be encrypted by the secure enclave 122 (e.g., by the processor 132 of the secure enclave 122). Additionally or alternatively, the digitized biometrics 110, 112, 116, 118 may be encrypted by the computing device 104. For example, the computing device 104 may receive an encryption key from the secure enclave 122 (e.g., an encryption key generated based on the biometrics encryption seed 120 and the device key 126). As another example, the computing device 104 may receive an intermediate value from the secure enclave 122 (e.g., an intermediate value generated based on the biometrics encryption seed 120 and/or the device key 126), which may then be used to generate an encryption key. The computing device 104 may then encrypt the digitized biometrics 110, 112, 116, 118 using the encryption key received from the secure enclave 122 or generated from the intermediate value received from the secure enclave 122.

The encrypted biometrics may be stored (block 412). For example, the encrypted biometrics 130, 222 may be stored. Where the secure enclave 122 generate the encrypted biometrics 130, 222, the encrypted biometrics 130, 222 may be stored in the secure storage 124 of the secure enclave 122. Additionally or alternatively, where the computing device 104 generate the encrypted biometrics 130, 222, the encrypted biometrics 130, 222 may be stored in the storage 136. In certain implementations, the encrypted biometrics 130 may be stored on a non-volatile memory, such as a non-volatile memory of the secure storage 124 and/or a non-volatile memory of the storage 136.

The method 400 may be performed to initially register biometrics and digitized biometrics 110, 112, 116, 118 that may be used to authenticate the user 102 and/or access the data 138. In particular, because the encryption key 128 is generated based on the digitized biometrics 110, 112, 116, 118, it may only be possible to accurately generate the encryption key 128 based on digitized biometrics 110, 112, 116, 118. In future instances, the method 400 may be repeated at least in part to authenticate the user 102 and decrypt the data 138, providing access to the computing device 104. For example, the computing device 104 may repeat blocks 402-406 to generate the encryption key 128 and may utilize the encryption key 128 to decrypt the data 138, allowing the user 102 to access the data 138. In certain implementations, the method 400 may be performed at least in part by different computing hardware. For example, blocks 402-406 may be performed by a processor 132 of the secure enclave 122 and blocks 408-412 may be performed by a processor 140 of the computing device 104. Other implementations may be possible. For example, at least one of the blocks 402-406 may be performed by the processor 140 and at least one of the blocks 408-412 may be performed by the processor 132.

In further implementations, the stored, encrypted biometrics 130, 222 may be subsequently accessed. For example, the user 102 may not be able to provide identical or nearly-identical digitized biometrics (e.g., due to biometric drift or other changes in the user 102's biometrics). In such instances, the user 102 may provide the biometrics encryption seed 120 and may request access to the stored, encrypted biometrics 130, 222. In such instances, the computing device 104 and/or the secure enclave 122 may retrieve and decrypt the encrypted biometrics 130 based on the provided biometrics encryption seed 120 using techniques similar to those discussed above in connection with the decryption procedure 300. Furthermore, after retrieving and decrypting the encrypted biometrics 130, the computing device 104 may require the user 102 to create a new encryption key (e.g., an updated encryption key) to replace the encryption key 128. For example, blocks 402-406 may be repeated to receive updated biometrics and to generate the new encryption key and use the new encryption key to encrypt the data 138. Furthermore, blocks 408-412 may be repeated to store encrypted biometrics for the updated biometrics used to create the new encryption key.

Accordingly, the method 400 allows for the use of digitized biometrics 110, 112, 116, 118 in generating encryption keys 128 to secure data 138 that accounts for situations where biometrics of the user 102 change, preventing accurate scans and reproduction of the digitized biometrics 110, 112, 116, 118 used to generate the encryption keys 128. In particular, the method 400 allows for secure storage and retrieval of copies of the digitized biometrics. Further, in instances where an ordered and/or timed sequence of digitized biometrics are used to generate the encryption key 128, the method 400 may prevent generation of the encryption key 128 even where copies of the digitized biometrics 110, 112, 116, 118 are illicitly retrieved. Additionally, transformation (e.g. hashing) of the digitized biometrics prior to encrypted storage and/or generation of the encryption key 128 reduces the value of illicitly procuring the biometric data for use in outside applications and prevents biometric data from outside applications to be used in this method. In this way, the method 400 improves the security of data 138 stored within the computing device 104 while also improving convenience for users who are still able to utilize and rely on biometrics scans, which may be faster and/or more convenient to use while accessing secure data 138 and/or authenticating with the computing device 104.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

For the purpose of this specification, the word "comprising" means "including but not limited to", and the word "comprises" has a corresponding meaning.

The contents of all references, and published patents and patent applications cited throughout the application are hereby incorporated by reference. Those skilled in the art will recognize that the disclosure may be practiced with variations on the disclosed structures, materials, compositions and methods, and such variations are regarded as within the ambit of the disclosure.

The invention claimed is:

1. A method for generating an encryption key for use in cryptographic applications, the method comprising:
   (a) scanning a plurality of biometrics;
   (b) digitizing at least a subset of the plurality of biometrics to form a plurality of digitized biometrics;
   (c) generating the encryption key based on the plurality of digitized biometrics;
   (d) encrypting data for storage using the encryption key;
   (e) receiving a biometrics encryption seed;
   (f) encrypting the plurality of digitized biometrics at least in part based on the biometrics encryption seed to generate a first plurality of encrypted biometrics;
   (g) storing the first plurality of encrypted biometrics;
   (h) receiving, at a later time, the biometrics encryption seed;
   (i) retrieving the first plurality of encrypted biometrics;
   (j) decrypting, based on the biometrics encryption seed, the first plurality of encrypted biometrics to generate the plurality of digitized biometrics;
   (k) generating the encryption key based on the plurality of digitized biometrics; and
   (l) decrypting the data using the encryption key.

2. The method of claim 1, wherein the encryption key is generated based on an ordered sequence of the plurality of digitized biometrics.

3. The method of claim 2, wherein generating the encryption key based on the plurality of digitized biometrics further comprises:
   generating, based on the ordered sequence of the plurality of digitized biometrics, an intermediate value; and
   generating the encryption key based on the intermediate value.

4. The method of claim 1, further comprising, prior to retrieving the first plurality of encrypted biometrics:
   presenting a multi-factor authentication challenge; and
   receiving a response that passes the multi-factor authentication challenge.

5. The method of claim 1, further comprising repeating (a)-(c) to receive an updated plurality of biometrics and to generate an updated encryption key based on at least a subset of the updated plurality of biometrics.

6. The method of claim 1, wherein the at least the subset of the plurality of biometrics includes at least two types of biometrics.

7. The method of claim 6, wherein the at least two types of biometrics are selected from the group consisting of fingerprint scans, two-dimensional facial scans, three-dimensional facial scans, vocal feedback matching, capillary scans, and iris scans.

8. The method of claim 1, wherein (a)-(c) are performed by a first processor and (d)-(f) are performed by a second processor.

9. The method of claim 1, further comprising:
   encrypting the plurality of digitized biometrics with a device key to generate a second plurality of encrypted biometrics,
   wherein the encryption key is generated based on the second plurality of encrypted biometrics, and
   wherein the second plurality of encrypted biometrics is encrypted at least in part based on the biometrics encryption seed to generate the first plurality of encrypted biometrics.

10. The method of claim 9, wherein the device key is uniquely and immutably associated with a computing device implementing the method.

11. The method of claim 1, wherein the plurality of digitized biometrics are digitized to a volatile memory and are deleted after completion of the method.

12. The method of claim 1, wherein the first plurality of encrypted biometrics are stored in a non-volatile memory.

13. The method of claim 12, wherein the non-volatile memory is at least a part of a secure enclave of a computing device implementing the method.

14. The method of claim 1, wherein the at least the subset of the plurality of biometrics are encrypted and stored separately.

15. The method of claim 1, wherein the at least the subset of the plurality of biometrics are encrypted and stored together.

16. The method of claim 1, wherein the encryption key is generated for use in a particular cryptographic application and is deleted upon completion of the cryptographic application.

17. The method of claim 1, wherein the cryptographic applications include generating digital signatures, encrypting data, and accessing previously-encrypted data.

18. The method of claim 1, wherein encrypting the plurality of digitized biometrics comprises transforming the plurality of digitized biometrics prior to encrypting the plurality of digitized biometrics with the biometrics encryption seed.

19. The method of claim 1, wherein transforming the plurality of digitized biometrics includes at least one of hashing the plurality of digitized biometrics and salting the plurality of digitized biometrics.

* * * * *